Figure 2:
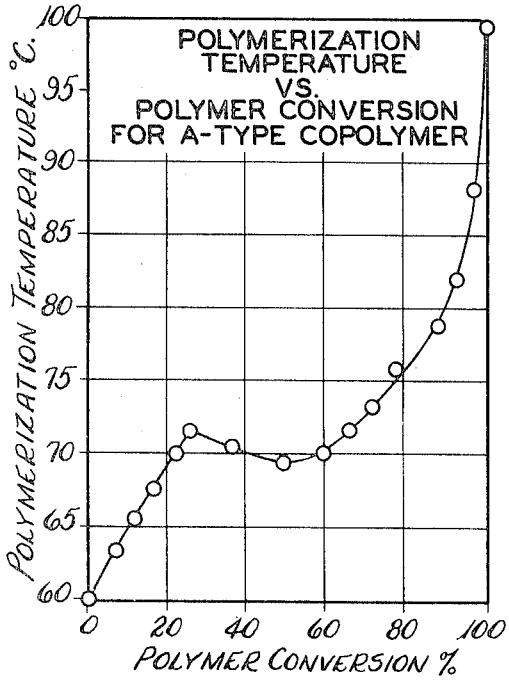
Figure 3:
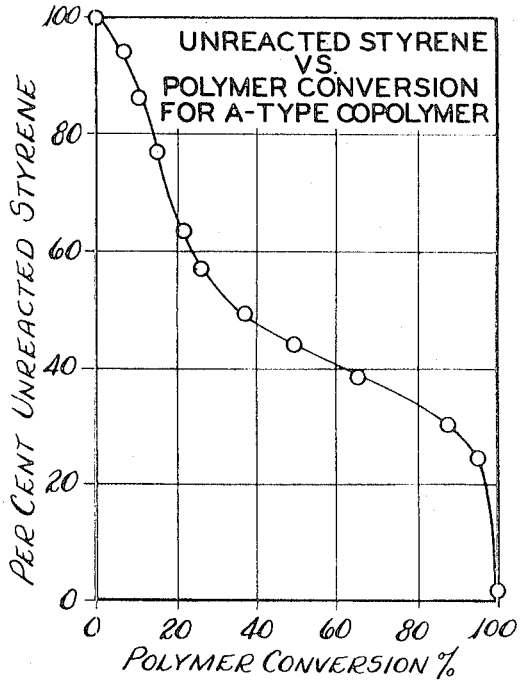
Figure 4:
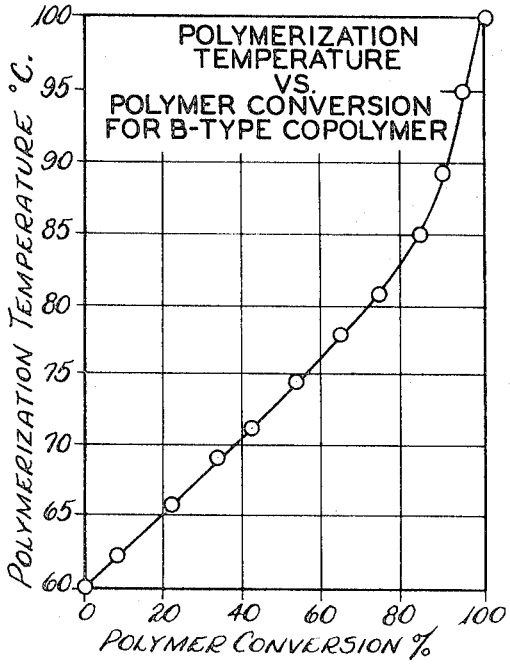
Figure 5:
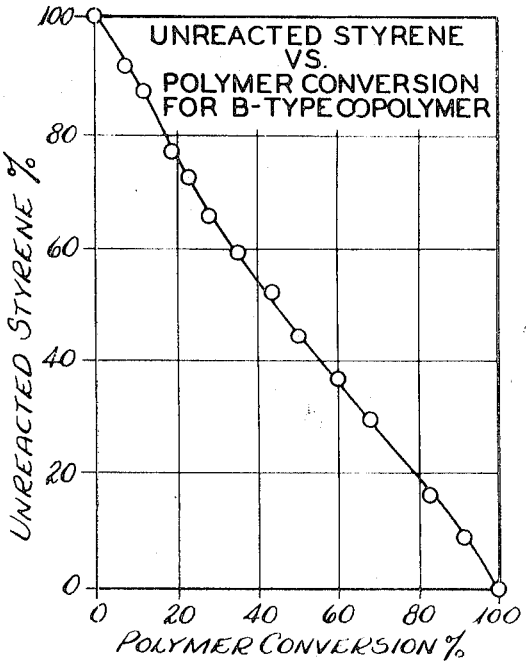
Figure 6:
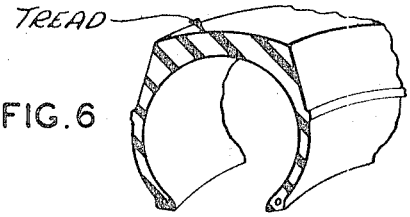

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

983 O.G. 401

T893,004

BLOCK COPOLYMERS OF BUTADIENE AND STYRENE

William Glenn Mayes, Akron, Ohio, assignor to The Firestone Tire & Rubber Company, Akron, Ohio

Continuation of application Ser. No. 658,550, Aug. 4, 1967. This application Oct. 12, 1970, Ser. No. 80,249

Int. Cl. C08f *15/04*

U.S. Cl. 260—880 B

2 Sheets Drawing. 14 Pages Specification

New copolymers of butadiene and either styrene or a styrene-type monomer are formed in which all of the styrene or styrene-type units are relatively uniformly distributed in butadiene at one or both ends of the molecule, and the balance of the molecule is composed of butadiene. Tire treads made from the copolymers exhibit better wear resistance than other butadiene-styrene copolymers.

BLOCK COPOLYMERS OF BUTADIENE AND STYRENE

Filed Oct. 12, 1970 2 Sheets-Sheet 1

FIG. 1

| NAME | STYRENE CONTENT | MOLECULAR STRUCTURE | STYRENE CONTENT VS. CONVERSION C=CUMULATIVE S=SEGMENTAL | TOW BAR WEAR INDEX | TIRE TEST WEAR INDEX |
|---|---|---|---|---|---|
| POLYBUTADIENE CONTROL | CUMULATIVE | 0% 0% 0% 0% | % ST. 40 30 20 10 0; C & S; 0 25 50 75 100 | 100 | 100 |
| | SEGMENTAL | 0% 0% 0% 0% | | | |
| CONSTANT COMPOSITION COPOLYMER | CUMULATIVE | 18% 18% 18% 18% | % ST. 40 30 20 10 0; C & S; 0 25 50 75 100 CONVERSION | 103 | 124 |
| | SEGMENTAL | 18% | | | |
| HIGH INITIAL & FINAL STYRENE | CUMULATIVE | 36% 27% 18% 15% 12% 15% 18% | % ST. 40 30 20 10 0; C; S; 0 25 50 75 100 CONVERSION | 151 | 137 |
| | SEGMENTAL | 36% 0% 36% | | | |
| HIGH INITIAL STYRENE | CUMULATIVE | 36% 36% 27% 18% | % ST. 40 30 20 10 0; C; S; 0 25 50 75 100 CONVERSION | 162 | 141 |
| | SEGMENTAL | 36% 0% | | | |

BLOCK COPOLYMERS OF BUTADIENE AND STYRENE

Filed Oct. 12, 1970 2 Sheets-Sheet 2